United States Patent [19]

Kuno

[11] Patent Number: 4,780,576
[45] Date of Patent: Oct. 25, 1988

[54] INSULATED ELECTRICAL CABLE
[75] Inventor: Mineya Kuno, Osaka, Japan
[73] Assignee: Sumitomo Electric Industries, Ltd., Osaka, Japan
[21] Appl. No.: 22,897
[22] Filed: Mar. 6, 1987
[30] Foreign Application Priority Data
  Mar. 6, 1986 [JP] Japan ................... 61-50104
[51] Int. Cl.$^4$ ............................... H01B 7/02
[52] U.S. Cl. .................. 174/120 SR; 174/110 SR; 174/110 PM; 174/110 V; 174/120 SC; 428/394
[58] Field of Search ..... 174/110 V, 110 SR, 110 PM, 174/120 SC, 120 SR; 428/375, 394

[56] References Cited
U.S. PATENT DOCUMENTS 3,908,068  9/1975  MacKenzie, Jr. et al. ... 174/110 SR X
4,092,488  5/1978  Hayami et al. .......... 174/110 PM X
4,109,098  8/1978  Olsson et al. ............ 174/120 SC X
4,322,575  3/1982  Skipper ................... 174/120 SR
4,575,184  3/1986  Ueno et al. ............. 174/110 SR X

FOREIGN PATENT DOCUMENTS 1211249  9/1986  Canada .
0099640  2/1984  European Pat. Off. .
0100247  2/1984  European Pat. Off. .
0152911  8/1985  European Pat. Off. .

Primary Examiner—Morris H. Nimmo
Attorney, Agent, or Firm—Sughrue, Mion, Zinn, Macpeak, and Seas

[57] ABSTRACT

An insulated electrical cable is disclosed, comprising an electrical conductor coated with an insulating layer comprising an ethylene/α-olefin copolymer having a density of from 0.89 to 0.91 and an ethylene/vinyl acetate copolymer.

7 Claims, 1 Drawing Sheet

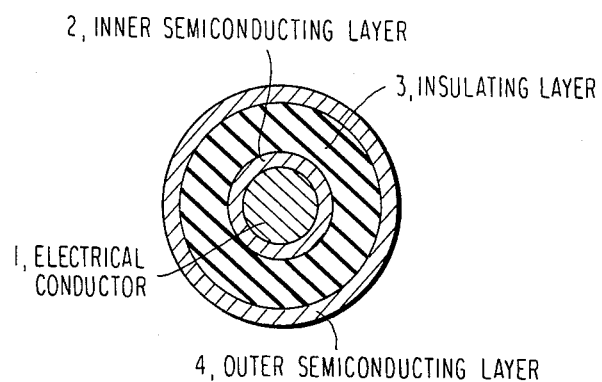

INSULATED ELECTRICAL CABLE

FIELD OF THE INVENTION

The present invention relates to an electrical cable having superior long-term stability, and in particular, to an electrical cable suitable for use with, e.g., an electrostatic dust precipitator or an ion generator.

BACKGROUND OF THE INVENTION

Electrostatic dust precipitators and ion generators are conventionally operated with rubber insulated cables, crosslinked polyethylene insulated cables, or polyethylene insulated cables. Crosslinked polyethylene insulated cables and polyethylene insulated cables have good electrical characteristics and are easy to service and handle. However, these cables are not completely satisfactory in terms of flexibility and long-term stability and, particularly, sometimes insulation breakdowns within a relatively short period of time if they are exposed to peculiar conditions in field use, for example, in the case of where the cable is used for an electrostatic dust precipitator or an ion generator in which the cables suffer from cyclic application of voltage with damped ocillation. It has therefore been desired to develop an insulated electrical cable that is highly flexible and exhibits superior long-term stability.

SUMMARY OF THE INVENTION

An object of the present invention is to solve the aforementioned problems of the conventional art and to provide an insulated electrical cable that is highly flexible and which exhibits improved long-term stability.

The above and other objects of the present invention can be attained by an insulated electrical cable comprising an electrical conductor coated with an insulating layer comprising an ethylene/α-olefin copolymer having a density of from 0.89 to 0.91 and an ethylene/vinyl acetate copolymer.

BRIEF DESCRIPTION OF THE DRAWING

The drawing is a cross section of an insulated electrical cable according to one embodiment of the present invention.

DETAILED DESCRIPTION OF THE INVENTION

According to one embodiment of the present invention shown in the drawing, the cable comprising an electrical conductor 1 coated consecutively with an inner semiconducting layer 2, an insulating layer 3 according to the present invention, and an outer semiconducting layer 4; and an outer protective layer may also be provided (not shown in the drawing). The thickness of each layer is determined depending on the industrial standards of cables and the particular conditions under which the cable is intended to be used. The thickness of the insulating layer is generally is in the range of from 0.5 to 35 mm.

According to the above embodiment, the insulating layer 3 is formed on the inner semiconductor layer 2 by extrusion-coating a mixture of an ethylene/α-olefin copolymer having a density of from 0.89 to 0.91 and an ethylene/vinyl acetate copolymer, or a mixture of the two copolymers which further contains a crosslinking agent such as dicumyl peroxide followed by crosslinking the coated mixture.

As a method for crosslinking the coated mixture, any of conventional methods, such as a chemical crosslinking method (in which organic peroxides are subjected to heat under pressure), a silane crosslinking method, a irradiation crosslinking method, etc., can be used. Generally, in the case where the thickness of the insulating layer is as thick as 2.5 mm or more, the chemical crosslinking method and the silane crosslinking method are preferred.

As the ethylene/α-olefin copolymer used in the present invention, any ethylene/α-olefin copolymer having a density of from 0.89 to 0.91 can be used. The ethylene/α-olefin copolymer is preferably contained in the insulating layer in an amount of 35 wt% or more.

The insulating layer of the present invention preferably contains from 5 to 30 wt%, and more preferably from 15 to 30 wt%, of an ethylene/vinyl acetate copolymer. Any of ethylene/vinyl acetate copolymers can be used in the present invention, however, the ethylene/vinyl acetate copolymer preferably has a vinyl acetate content of from 5 to 45 wt%, more preferably from 10 to 30 wt%.

As is clear from the Examples described below, an insulated electrical cable having the insulating layer according to the present invention withstands cyclic application of a voltage with damped oscillation for a prolonged period, and yet exhibits great resistance to bending.

The present invention is described below in greater detail by reference to the following examples although it is not intended to be limited thereto.

EXAMPLE 1

Samples 1 to 8 of insulated electrical cable were prepared by extrusion-coating a single wire of copper conductor (1 mm diameter) successively with an inner semiconducting layer (0.8 mm thick), an insulating layer (1 mm thick) formed of the materials shown in Table 1, and an outer semiconducting layer (0.8 mm thick). The insulating layer of Sample 1 was crosslinked by heating at 200° C. for 2 minutes in a nitrogen atmosphere at 5 kg/cm$^2$ and subsequent cooling in water to room temperature. In Table 1, the amounts of each ingradient are indicated in terms of parts by weight.

TABLE 1

| | Sample | | | | | | | |
|---|---|---|---|---|---|---|---|---|
| | 1* | 2 | 3 | 4 | 5 | 6 | 7 | 8 |
| HFDJ 4201 (Nippon Unicar Co., Ltd.) | 100 | — | — | — | — | — | — | — |
| Ethylene/butene copolymer (density, 0.906; MI, 0.8) | — | — | — | 70 | 80 | — | — | 60 |
| Ethylene/butene copolymer (density, 0.900; MI, 0.4) | — | — | — | — | — | 80 | 90 | — |
| Sumikathene C 215 (Sumitomo Chemical Co., Ltd. | — | 80 | — | — | — | — | — | — |
| Ethylene/butene copolymer (density, 0.922; MI, 0.7) | — | — | 80 | — | — | — | — | — |
| Ethylene/vinyl acetate copolymer (5% vinyl acetate) | — | — | — | 30 | — | — | — | — |
| Ethylene/vinyl acetate copolymer (20% vinyl acetate) | — | 20 | 20 | — | 20 | 20 | — | 40 |
| Ethylene/vinyl acetate copolymer | — | — | — | — | — | — | 10 | — |

TABLE 1-continued

|  | Sample | | | | | | | |
|---|---|---|---|---|---|---|---|---|
|  | 1* | 2 | 3 | 4 | 5 | 6 | 7 | 8 |
| (45% vinyl acetate) | | | | | | | | |

Note:
Samples 1 to 3 and 8 are comparative samples, and Samples 4 to 7 are samples according to the present invention.
*crosslinked
HFDJ 4201: Low density polyethylene containing about 2 wt % of dicumyl peroxide and about 0.3 wt % of an antioxidant
Sumikathene C 251: Low density polyethylene Each of the cable samples was fed with cyclic application of voltage with damped oscillation (maximum peak voltage, 50 kV; oscillating frequency, 5 MHz; time constant, 10 μsecond). The number of voltage applications that each sample could withstand before insulation breakdown occurred was counted and indicated in Table 2 as a value relative to that for Sample 1.

Each of the samples was then subjected to a cyclic bending test consisting of winding onto, and unwinding from, a rod having the same diameter as the cable under test. After 50,000 cycles of testing, the samples were fed with cyclic application of voltage with damped oscillation under the same conditions as shown above. The number of voltage applications that each sample could withstand before insulation breakdown occurred was counted, and is indicated in Table 2 as a value relative to that for Sample 1 which had not been subjected to a cyclic bending test.

TABLE 2

| Sample | Relative number of voltage applications to insulation breakdown | Relative number of voltage applications to insulation breakdown (after bending test) |
|---|---|---|
| 1 | 1* | 0.1 |
| 2 | 1.6 | 0.3 |
| 3 | 2.1 | 0.8 |
| 4 | 1.3 | 1.3 |
| 5 | 1.8 | 1.6 |
| 6 | 1.6 | 1.6 |
| 7 | 1.5 | 1.4 |
| 8 | 0.9 | 0.9 |

Note:
Samples 1 to 3 and 8 are comparative samples, and Samples 4 to 7 are samples according to the present invention.
*The number (relative to 1) of voltage applications to insulation breakdown of Sample 1 (not suffering bending test) was taken as the standard.

From the results shown in Table 2, insulated electrical cables according to the present invention have a prolonged life under application of voltage with damped oscillation and exhibit great resistance to bending.

EXAMPLE 2

Additional Samples 9 to 15 of insulated electric cable were prepared by extrusion-coating a single wire of copper conductor (1 mm diameter) successively with an inner semiconducting layer (0.8 mm thick), an insulating layer (1 mm thick) formed of the materials shown in Table 3 in combination with a crosslinking agent (dicumyl peroxide), and an outer semiconducting layer (0.8 mm thick). The coatings formed were crosslinked by heating at 200° C. for 2 minutes in a nitrogen atmosphere at 5 kg/cm² and subsequent cooling in water to room temperature. In Table 3, the amounts of each ingredient are indicated in terms of parts by weight.

TABLE 3

|  | Sample | | | | | | | |
|---|---|---|---|---|---|---|---|---|
|  | 1 | 9 | 10 | 11 | 12 | 13 | 14 | 15 |
| HFDJ 4201 (Nippon Unicar Co., Ltd.) | 100 | — | — | — | — | — | — | — |
| Ethylene/butene copolymer (density, 0.906; MI, 0.8) | — | — | — | 70 | 80 | — | — | 60 |
| Ethylene/butene copolymer (density, 0.900; MI, 0.4) | — | — | — | — | — | 80 | 90 | — |
| Sumikathene C 215 (Sumitomo Chemical Co., Ltd.) | — | 80 | — | — | — | — | — | — |
| Ethylene/butene copolymer (density, 0.922; MI, 0.7) | — | — | 80 | — | — | — | — | — |
| Ethylene/vinyl acetate copolymer (5% vinyl acetate) | — | — | — | 30 | — | — | — | — |
| Ethylene/vinyl acetate copolymer (20% vinyl acetate) | — | 20 | 20 | — | 20 | 20 | — | 40 |
| Ethylene/vinyl acetate copolymer (45% vinyl acetate) | — | — | — | — | — | — | 10 | — |
| Crosslinking agent (dicumyl peroxide) | — | 2.0 | 2.0 | 2.5 | 2.5 | 2.5 | 2.5 | 2.5 |

Note:
Samples 1, 9, 10, and 15 are comparative samples, and Samples 11 to 14 are samples according to the present invention.

The prepared cable samples were subjected to an insulation breakdown test as in Example 1 before and after a cyclic bending test as in Example 1. The results are shown in Table 4.

TABLE 4

| Sample | Relative number of voltage applications to insulation breakdown | Relative number of voltage applications to insulation breakdown (after bending test) |
|---|---|---|
| 1 | 1* | 0.1 |
| 9 | 1.8 | 0.4 |
| 10 | 2.2 | 0.8 |
| 11 | 1.4 | 1.4 |
| 12 | 1.8 | 1.6 |
| 13 | 1.6 | 1.6 |
| 14 | 1.4 | 1.3 |
| 15 | 1.0 | 0.8 |

Note:
Samples 1, 9, 10, and 15 are comparative samples, and Samples 11 to 14 are samples according to the present invention.
*The number (relative to 1) of voltage applications to insulation breakdown of Sample 1 (not suffering bending test) was taken as the standard.

From the results shown in Table 4, insulated electric cables according to the present invention have a prolonged life under application of voltage with damped oscillation and exhibit great resistance to bending.

As shown in the above, an insulated cable according to the present invention exhibits improved long-term statility and is highly resistant to bending.

While the invention has been described in detail and with reference to specific embodiment thereof, it will be apparent to one skilled in the art that various changes and modifications can be made therein without departing from the spirit and scope thereof.

What is claimed is:
1. An insulated electrical cable comprising an electrical conductor coated with an insulating layer comprising an ethylene/α-olefin copolymer having a density of from 0.89 to 0.91 and an ethylene/vinyl acetate copolymer, wherein the content of said ethylene/vinyl acetate copolymer in said insulating layer is in a range of from

5 to 30 wt% and wherein the vinyl acetate content of said ethylene/vinyl acetate copolymer in said insulating layer is in a range of from 5 to 45 wt%.

2. An insulated electrical cable as in claim 1 comprising an electrical conductor coated consecutively with an inner semiconducting layer, said insulating layer, and an outer semiconducting layer.

3. An insulated electrical cable as in claim 1, wherein said insulating layer is crosslinked.

4. An insulated electrical cable as in claim 1, wherein the content of said ethylene/vinyl acetate copolymer in said insulating layer is in a range of from 15 to 30 wt%.

5. An insulated electrical cable as in claim 1, wherein the content of said ethylene/α-olefin copolymer in said insulating layer is 35 wt% or more.

6. An insulated electrical cable as in claim 1, wherein the vinyl acetate content of said ethylene/vinyl acetate copolymer in said insulating layer is in a range of from 10 to 30 wt%.

7. An insulated electrical cable comprising an electrical conductor coated with an insulating layer consisting essentially of an ethylene/α-olefin copolymer having a density of from 0.89 to 0.91 and an ethylene/vinyl acetate copolymer, wherein the content of said ethylene/vinyl acetate copolymer in said insulating layer is in a range of from 5 to 30 wt% and wherein the vinyl acetate content of said ethylene/vinyl acetate copolymer in said insulating layer is in a range of from 5 to 45 wt%.

* * * * *